United States Patent
Makmal et al.

(10) Patent No.: US 11,954,219 B1
(45) Date of Patent: Apr. 9, 2024

(54) SYSTEM, METHOD, AND COMPUTER PROGRAM FOR UNIVERSAL SECURITY OF CONTAINER IMAGES

(71) Applicant: Amdocs Development Limited, Limassol (CY)

(72) Inventors: Nir Makmal, Petah Tikva (IL); Gil Aizenband, Petah Tikva (IL); Rami Rozenblat, Ashkelon (IL); Ian Klein, Hatfield (GB); Lior Mazor, Tzufim (IL); Cedric Gegout, Rennes (FR)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 298 days.

(21) Appl. No.: 17/526,972

(22) Filed: Nov. 15, 2021

(51) Int. Cl.
*G06F 21/62* (2013.01)
*H04L 9/32* (2006.01)

(52) U.S. Cl.
CPC ........ *G06F 21/6218* (2013.01); *H04L 9/3247* (2013.01)

(58) Field of Classification Search
CPC .................. G06F 21/6218; H04L 9/3247
See application file for complete search history.

(56) References Cited

U.S. PATENT DOCUMENTS

| | | | |
|---|---|---|---|
| 10,002,247 B2 | 6/2018 | Suarez et al. | |
| 10,735,472 B2 | 8/2020 | Wainner et al. | |
| 11,573,816 B1* | 2/2023 | Featonby | H04L 67/10 |
| 11,805,136 B2* | 10/2023 | Abraham | G06N 5/04 |
| 2014/0095886 A1* | 4/2014 | Futral | G06F 21/57 |
| | | | 713/187 |
| 2017/0187540 A1* | 6/2017 | Stopel | H04L 63/1433 |
| 2018/0124055 A1 | 5/2018 | Chen et al. | |
| 2020/0296089 A1* | 9/2020 | Hsiung | H04L 63/061 |
| 2021/0011984 A1* | 1/2021 | Renke | G06F 21/552 |

FOREIGN PATENT DOCUMENTS

| | | |
|---|---|---|
| CN | 111562970 A | 8/2020 |
| WO | 2020207306 A1 | 10/2020 |

OTHER PUBLICATIONS

GitHub, "sigstore/cosign: Container Signing," GitHub, 2021, 21 pages, retrieved on Nov. 15, 2021, from https://github.com/sigstore/cosign.
Lorenc, D., "Cosign—Signed Container Images," Medium, sigstore, 2021, 4 pages, retrieved on Nov. 15, 2021, from https://blog.sigstore.dev/cosign-signed-container-images-c1016862618.
Docker, "Content trust in Docker," Docker Docs, 2021, 8 pages, retrieved on Nov. 15, 2021, from https://docs.docker.com/engine/security/trust/.
Red Hat, " Chapter 3. Signing Container Images," Red Hat Customer Portal, Chapter 3, 2021, 15 pages, retrieved on Nov. 15, 2021 from https://access.redhat.com/documentation/en-us/red_hat_enterprise_linux_atomic_host/7/html/managing_containers/signing_container_images.

* cited by examiner

*Primary Examiner* — Amie C. Lin
(74) *Attorney, Agent, or Firm* — Zilka-Kotab, P.C.

(57) ABSTRACT

As described herein, a system, method, and computer program are provided for securing container images. In use, a request to access a container image is identified. In response to the request, a digest of the container image is retrieved. The digest is validated according to an execution and business context. A response to the request is provided, based on a result of the validating.

16 Claims, 8 Drawing Sheets

SYSTEM, METHOD, AND COMPUTER PROGRAM FOR UNIVERSAL SECURITY OF CONTAINER IMAGES

FIELD OF THE INVENTION

The present invention relates to data security, source code protection, and vulnerability threat management.

BACKGROUND

When transferring data, such as applications or other source code, among networked systems, trust is often a central concern. In particular, when communicating data over an untrusted medium such as the internet, it is critical to ensure the integrity of the data and that the publisher of the data is authenticated, in order to provide protection of intellectual property (IP) and application functioning. One existing solution for securing data involving signing a container image of the data, which allows a user to add a digital fingerprint to an image. This fingerprint can later be cryptographically tested to verify trust, which allows the user of a container image to verify the source and to accordingly trust the container image.

Currently, the signed image and the repository where the image is located is tightly coupled to the source repository. Thus, if the image is moved to a different repository, then signature will not be valid anymore as a result there is no way to validate that the image integrity was not compromised in the transit. There exists no generic approach for image signing, nor support for each tenant of a multi-tenant system to manage the signing solution in its own way.

There is thus a need for addressing these and/or other issues associated with the prior art.

SUMMARY

As described herein, a system, method, and computer program are provided for securing container images. In use, a request to access a container image is identified. In response to the request, a digest of the container image is retrieved. The digest is validated according to an execution and business context. A response to the request is provided, based on a result of the validating.

DETAILED DESCRIPTION

Figure 1:
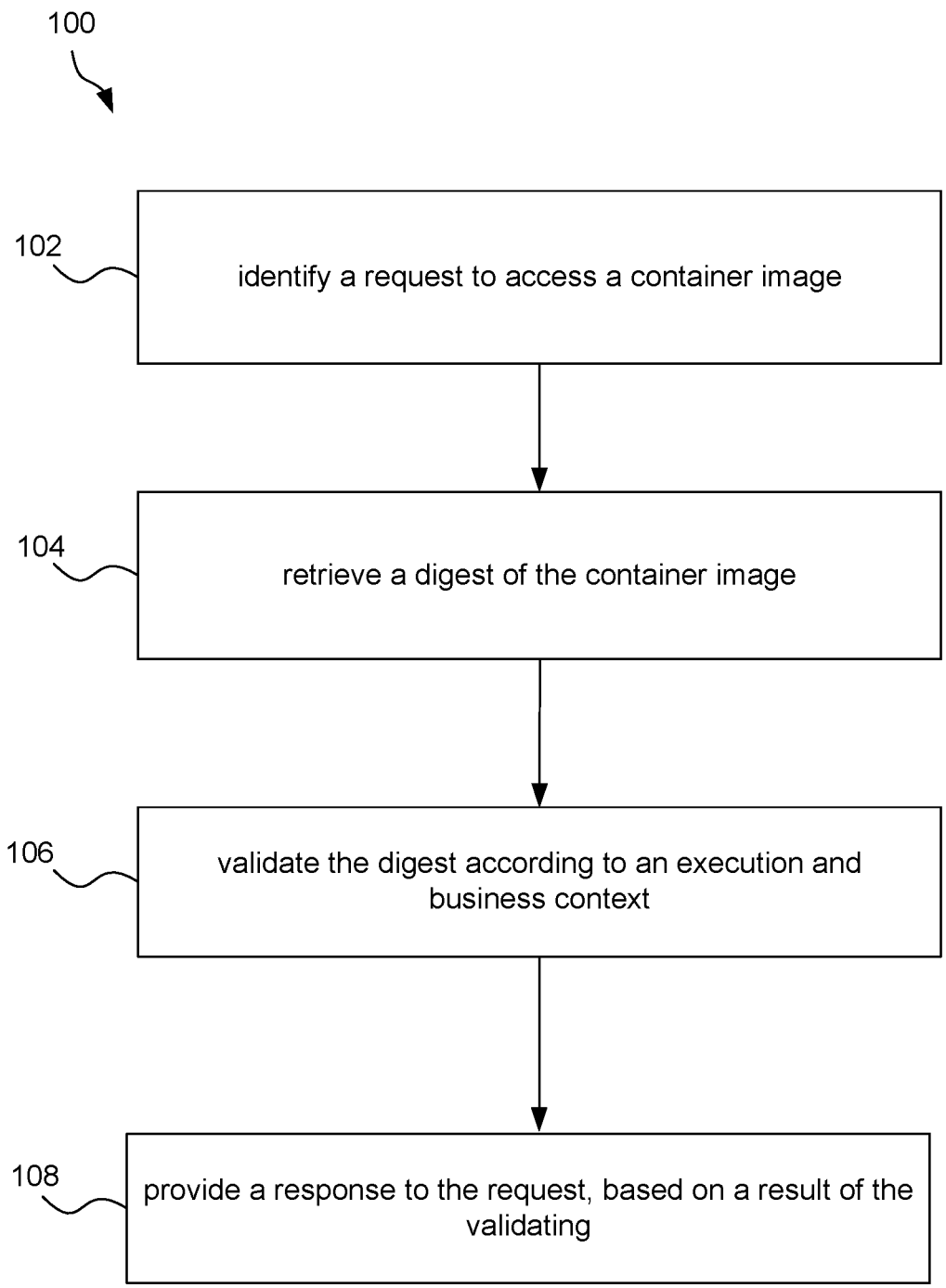
FIG. 1 illustrates a method for securing a container image, in accordance with one embodiment.

FIG. 1 illustrates a method 100 for securing a container image, in accordance with one embodiment. The method 100 may be performed by any computer system(s) described below with respect to FIGS. 7 and/or 8. For example, the method 100 may be performed by a computer system used to validate container images of applications, services, etc. prior to deployment thereof.

In operation 102, a request to access a container image is identified. With respect to the present description, the container image refers to an (e.g. lightweight, standalone) executable package (e.g. static file) of software that includes everything needed to run an application, service, microservice, etc., such as code, runtime, system tools, system libraries and settings. The container image becomes a container at runtime, which can be independent of any particular computing environment, and which is generally a standard unit of software that packages up code and all its dependencies so that the application runs quickly and reliably regardless of computing environment.

In one embodiment, the request may be generated based on a request to deploy a microservice, service, or other application represented by the container image. To this end, the request to access the container image may be issued, and in turn identified, as a result of the issuance of the deployment request.

In operation 104, a digest of the container image is retrieved, in response to the request. With respect to the present description, the digest refers to data that uniquely and immutably identifies the container image. In one embodiment, the digest may be a hash of the container image. For example, the digest may be created using a Secure Hash Algorithm (SHA).

In another embodiment, the digest of the container image may be retrieved from a container registry. The container registry may store the container image and its respective digest among a plurality of different container images and their respective digests.

In operation 106, the digest is validated according to an execution and business context. For example, the digest may be compared to the digests in a validated safe list and validated when the digest matches one of the digests in the validated safe list. Thus, the digest validation can be done per container image, where one embodiment is to generate a validated safe list of digests for use in enabling the validation, but other validation methods can be implemented. To this end, a particular validation method may be configured for the execution and business context in which the request has been received.

The validated safe list may refer to a safe list of the digests generated for the container image that has been validated. Initially, the container image may be accessed, the safe list for the container image may be created, the safe list signed with the signature, and the signed safe list stored in a signed safe list repository. The signed safe list may then be made accessible in the signed safe list repository. In one embodiment, the safe list for the digest validation can be created on the fly in response to the request, according to any deployment and runtime context (e.g. business context, customer's policy). In another embodiment, the safe list may be created prior to receiving the request.

The safe list may be validated by accessing the safe list (e.g. in the signed safe list repository), which has been signed with a signature, and then verifying the signature to in turn store the safe list as the validated safe list. In one embodiment, storing the safe list as the validated safe list may include storing the safe list in a trusted safe list repository. As an option, the safe list may be formatted prior to storing the safe list in the trusted safe list repository. In another embodiment, when the signature is not verified, the safe list may be stored in an untrusted safe list repository.

To this end, the validation of the digest may be repository-agnostic. In other words, the digest and corresponding container image may not be required to be tied to any particular repository in order for the digest to be validated. The digest must simply be validated against the validated safe list of digests generated for the container image.

In operation 108, a response to the request is provided, based on a result of the validating. In one embodiment, when the result of the validation is that the digest is valid, the response to the request may include retrieving the container image and providing the container image to a requestor or other designated entity. The response may further include providing information to cope with any potential gaps induced by the acceptance of the digest. Thus, when the digest is validated, the container image is retrieved (e.g. from the container registry) and is provided (e.g. with the information) to the entity that issued the request or to another designated entity. The entity may then use the container image to deploy the microservice, service, or other application represented by the container image.

On the other hand, when the result of the validation is that the digest is not valid, the response to the request may include rejecting the request to access the container image. In this case, the container image may not have been provided to the entity that issued the request for the container image. Accordingly, deployment of the container image may be secured by using the validated safe list of digests generated for the container image.

When rejecting the request, information can be generated by the validation process in order for the entity that issued the request to find mitigations. Thus, the response to the request may include providing information enabling already deployed infrastructure and application to cope with gaps induced by the rejection. Indeed, the container could not have been deployed resulting in potential functional gaps in the solution. Other parts of the deployed solution may have to be informed and to react to compensate for those gaps. For example, the other services of the deployed solution may activate circuit breaking modes to deactivate some internal behaviors.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
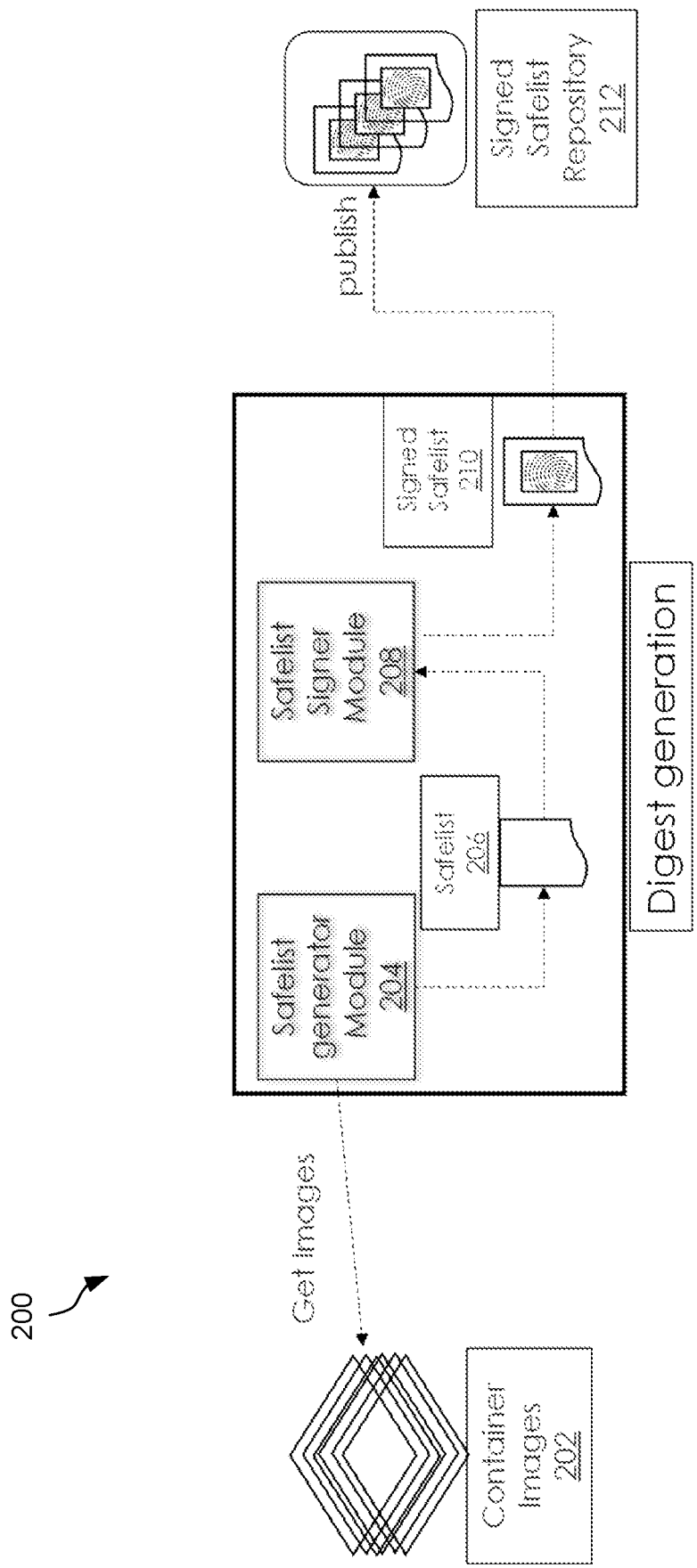
FIG. 2 illustrates a flow diagram of a system for creating a safe list of digests for a container image, in accordance with one embodiment.

FIG. 2 illustrates a flow diagram of a system 200 for creating a safe list of digests for a container image, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below. The system may be a multi-tenant-based system that supports multiple tenants. Further, each tenant can implement digest generation differently, in which case they may provide to the system plugins for use by the system when processing the digests.

As shown, a safelist (aka "safe list") generator module 204 retrieves a container image from a plurality of container images 202. The plurality of container images 202 may be stored in a container registry. The safelist may be retrieved when a new container image is stored to the container registry or when an existing container image is updated in the container registry.

The safelist generator module 204 generates a safelist 206 for the container image. The safelist 206 includes a digest of the container image. A safelist signer module 208 signs the safelist 206 with a signature to form a signed safelist 210. The signature may correspond to a digest generator that includes the safelist generator module 204 and the safelist signer module 208. The signed safelist 210 is published to a signed safelist repository 212.

It should be noted that the system 200, or at least the digest generator, may be supplied by an entity separate from a vendor providing the microservice, service, or other application corresponding to the container image. For example, the system 200, or at least the digest generator, may be supplied by a multi-trust authority, in one embodiment. As noted above, each tenant of the multi-tenant system may employ its own digest generator, as desired.

Figure 3:
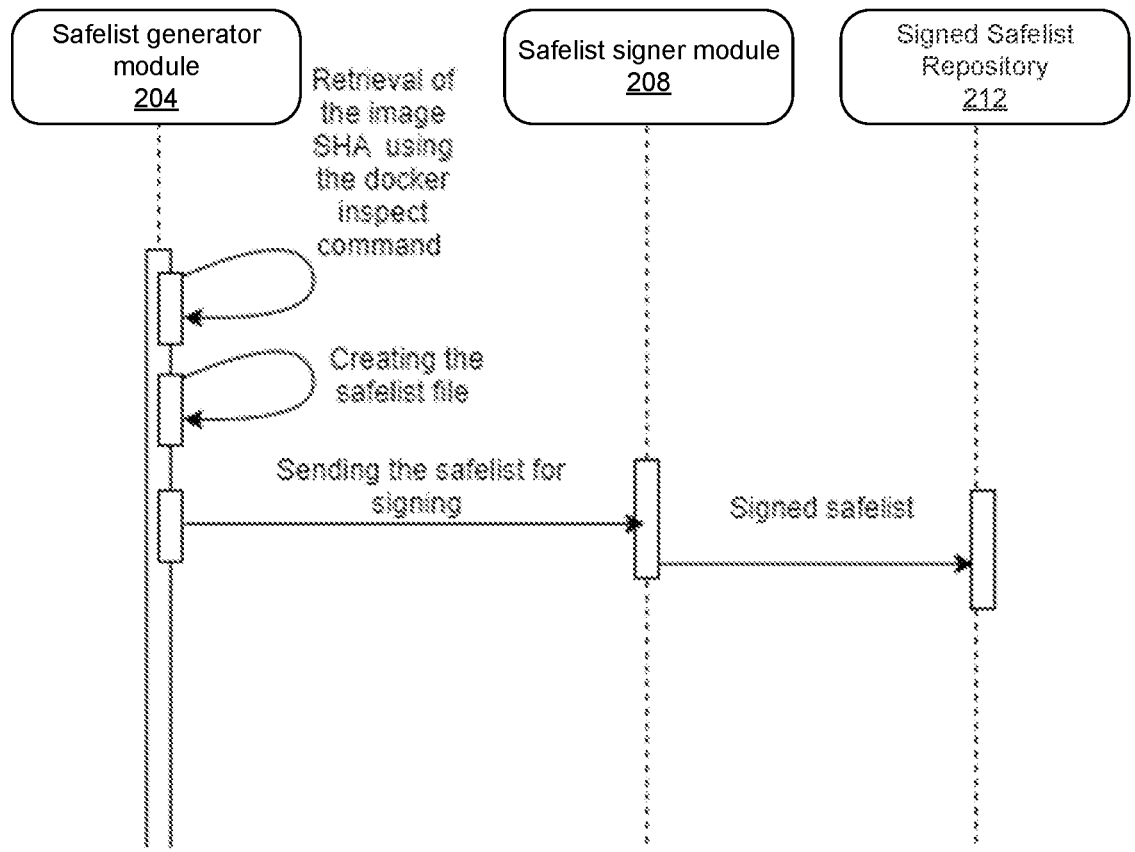
FIG. 3 illustrates a safelist generation sequence flow diagram for the components of the system of FIG. 2, in accordance with one embodiment.

FIG. 3 illustrates a safelist generation sequence flow diagram for the components of the system 200 of FIG. 2, in accordance with one embodiment. As an option, the flow diagram may be implemented in the context of the details of the previous figure and/or any subsequent figure(s). Of course, however, the flow diagram may be implemented in the context of any desired environment, including different tenant environments. Further, the aforementioned definitions may equally apply to the description below.

As shown, the safelist generator module 204 retrieves the container image SHA (or other digest) and creates a safelist (file) for the container image that includes the digest. The safelist generator module 204 then sends the safelist to the safelist signer module 208 which signs the safelist with a signature to form the signed safelist. The safelist generator module 204 publishes (stores) the signed safelist in the signed safelist repository 212.

Figure 4:
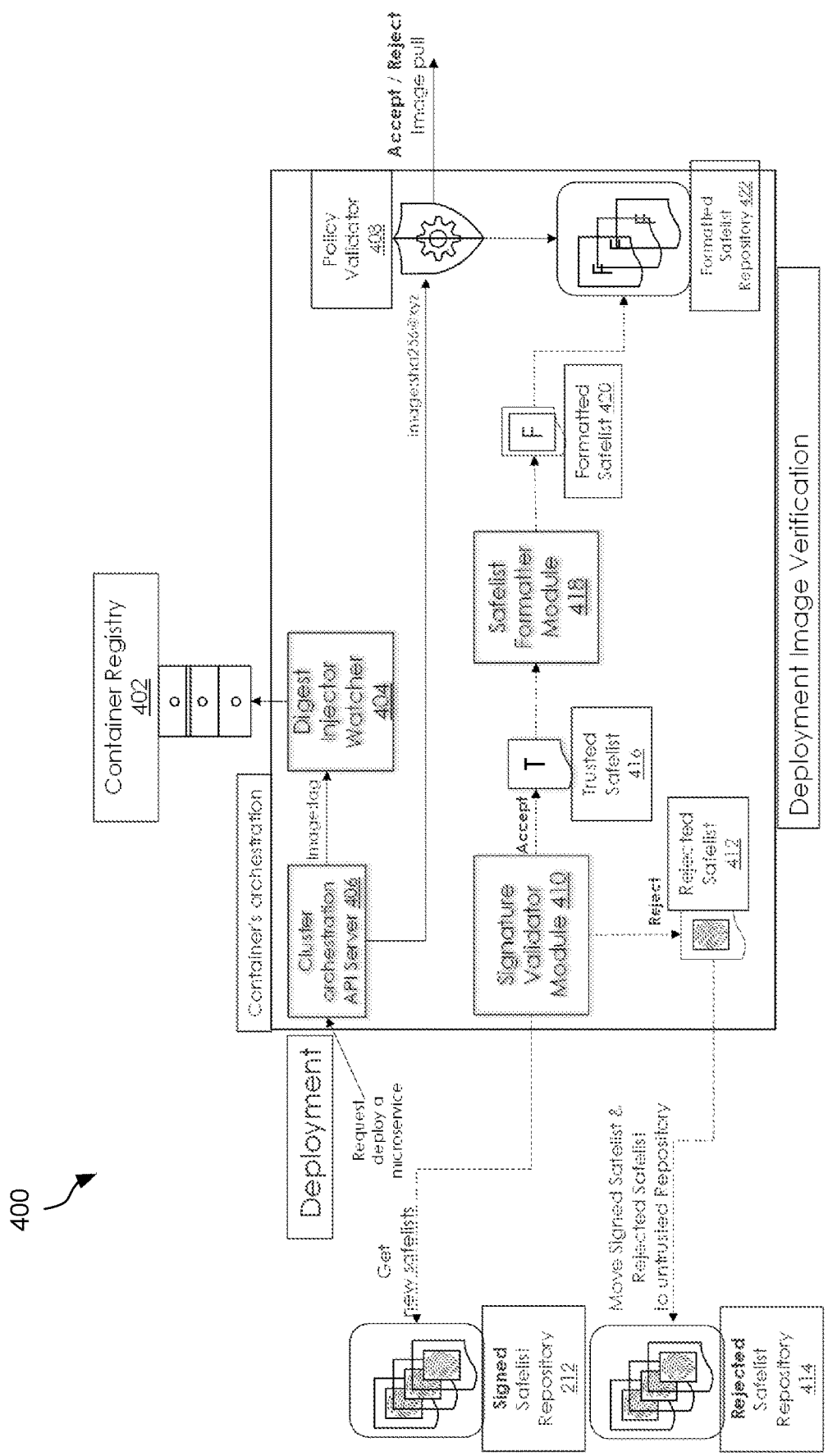
FIG. 4 illustrates a flow diagram of a system for responding to a request for a container image, in accordance with one embodiment.

FIG. 4 illustrates a flow diagram of a system 400 for responding to a request for a container image, in accordance with one embodiment. As an option, the system 400 may be implemented in the context of the details of the previous figure and/or any subsequent figure(s). Of course, however, the system 400 may be implemented in the context of any desired environment. Further, the aforementioned definitions may equally apply to the description below.

As shown, a container registry 402 that stores container images and corresponding digests is accessed by a digest injector watcher 404 when a request to deploy a microservice (or service or application) is issued to a cluster orchestration application programming interface (API) server 406. The digest for the container image is provided to a policy validator 408.

As also shown, signature validator module 410 retrieves a safelist for the container image from a signed safelist repository 212. The signature validator module 410 determines whether a signature of the safelist is valid. If the signature is not valid, the signature validator module 410 rejects the safelist to form a rejected safelist 412 which is then stored in a rejected safelist repository 414. This can be used to detect attacks and security analysis and also to deal with DoS (denial of service) attacks since the safelist will not be removed from the signed safelist (212) such that the signature validator module 410 will not validate it again.

If the signature is valid, the signature validator module 410 accepts the safelist to form a trusted safelist 416 which is then provided to a safelist formatter module 418. The safelist formatter module 418 formats the safelist to form a formatted safelist 420 which is then stored in a formatted safelist repository 422 as a validated safelist for the container image. The formatting may refer to converting the safelist from an image:tag format to an image:digest format. Support for "multi-trust authorities" may be provided whereby each authority will provide a plugin to the safelist formatter module 418 with the logic to convert the authority format to the format of the formatted safelist repository 422.

When the policy validator 408 receives the digest for the container image as a result of the request to deploy the microservice, the policy validator 408 validates the digest using the validated safelist already stored in the formatted safelist repository 422 for the container image. If the policy validator 408 determines that the digest is valid, the policy validator 408 causes the container image to be pulled from the container registry and provided for use in deploying the microservice. If the policy validator 408 determines that the digest is not valid, the policy validator 408 does not cause the container image to be pulled from the container registry such that the request to deploy the microservice is rejected. Further, the digest may be logged for future security analysis to detect security attacks and breaches.

Figure 5:
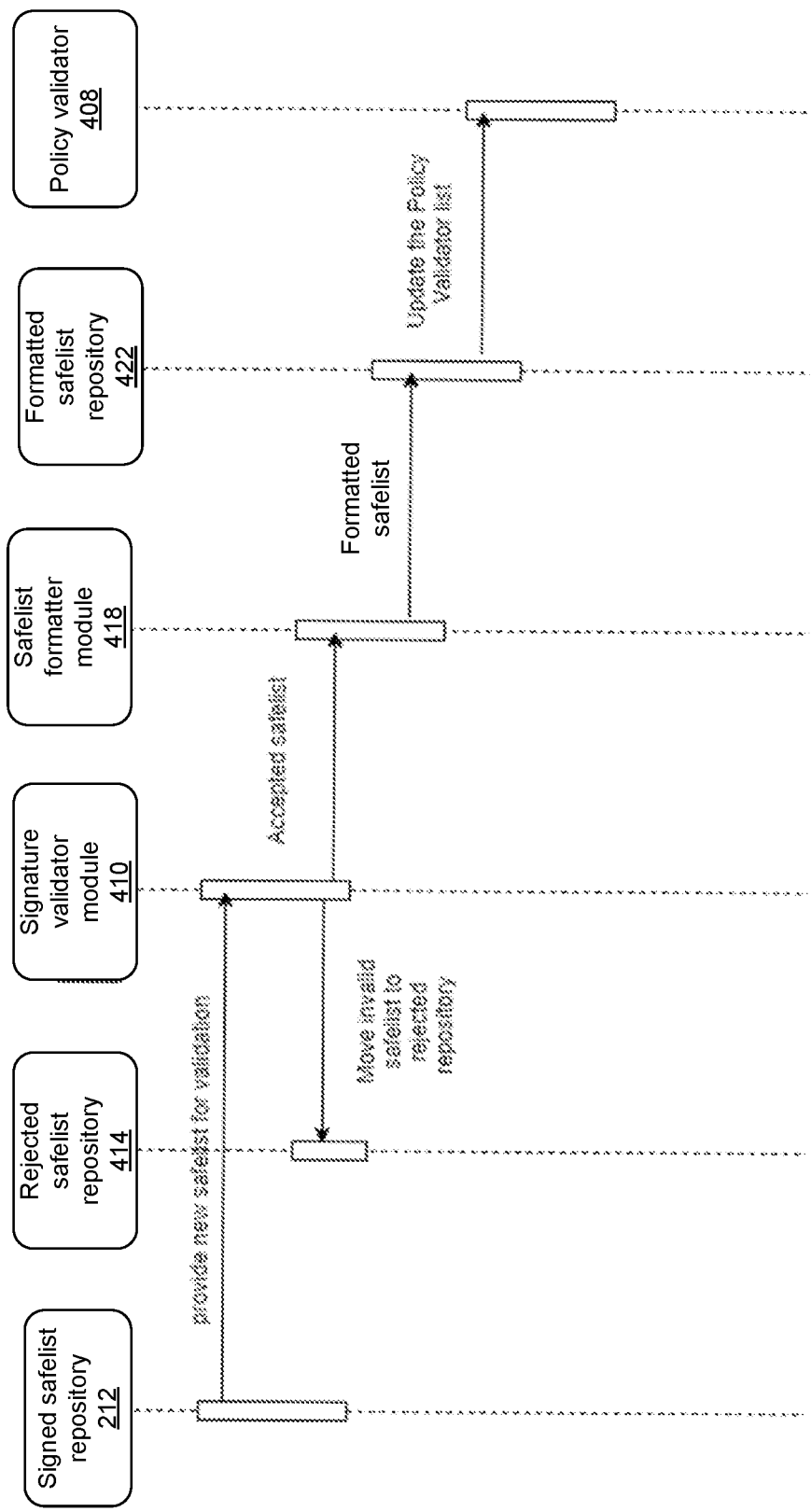
FIG. 5 illustrates a safelist update sequence flow diagram for the components of the system of FIG. 4, in accordance with one embodiment.

FIG. 5 illustrates a safelist update sequence flow diagram for the components of the system 400 of FIG. 4, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

As shown, the signature validator module 410 retrieves a safelist for a container image from the signed safelist repository 212. If a signature of the safelist is not valid, the signature validator module 410 stores the invalid safelist in the rejected safelist repository 414. If the signature is valid, the signature validator module 410 provides the accepted safelist to the safelist formatter module 418. The safelist formatter module 418 formats the safelist and stores the formatted safelist in the formatted safelist repository 422.

The formatted safelist is then provided to, or otherwise retrieved by, the policy validator 408 from the formatted safelist repository 422. The formatted safelist is used to update a policy for the container image, namely to include the safelist of digests generated for the container image.

Figure 6:
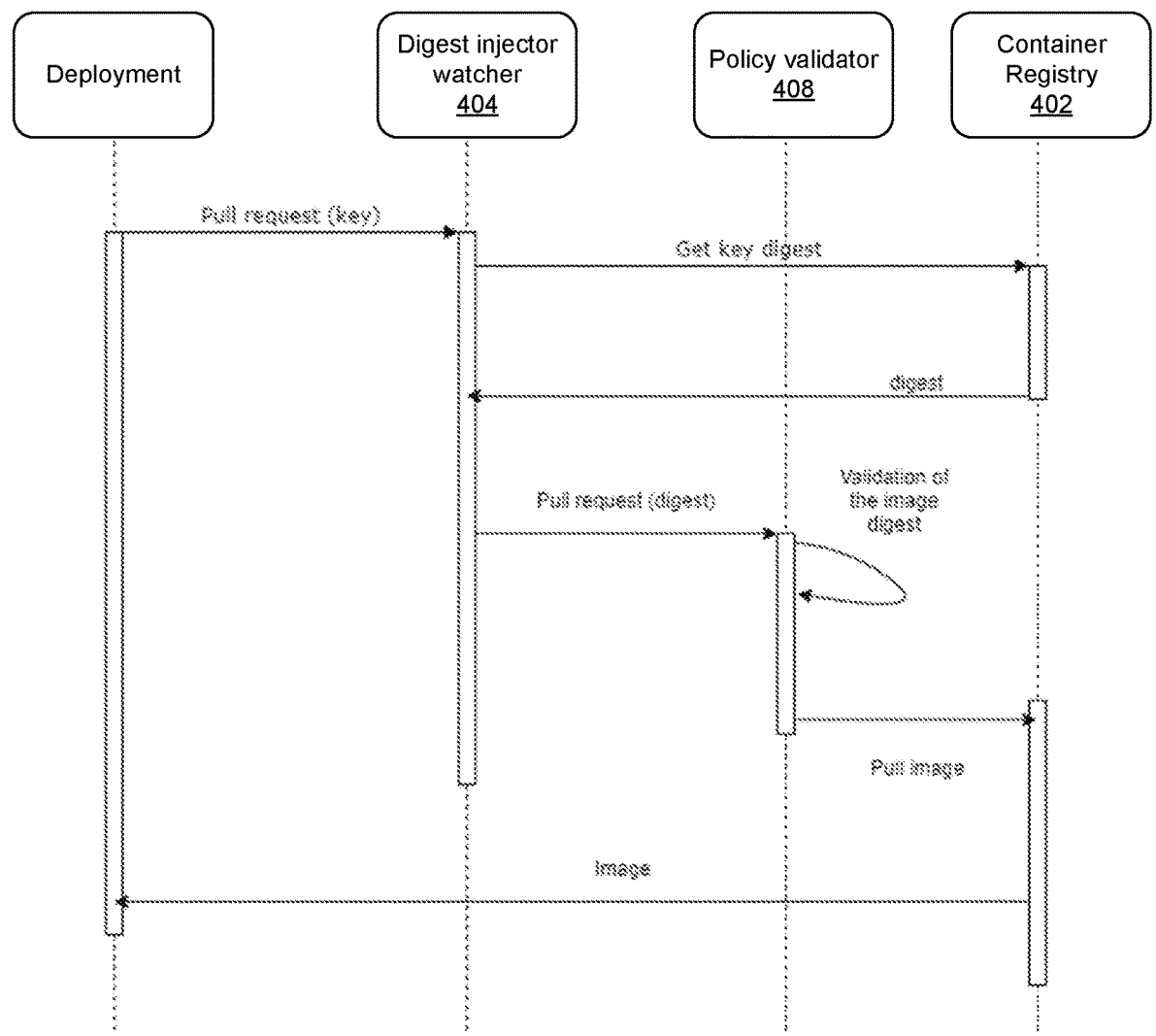
FIG. 6 illustrates a digest validation sequence flow diagram for the components of the system of FIG. 4, in accordance with one embodiment.

FIG. 6 illustrates a digest validation sequence flow diagram for the components of the system 400 of FIG. 4, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

As shown, a pull request for a container image, identified by a key, is received, or detected, by a digest injector watcher 404. The digest injector watcher 404 retrieves the digest of the container image from container registry 402. The digest injector watcher 404 injects the digest of the container image into the pull request so that it can be checked by the policy validator 408. The policy validator 408 validates the digest (against its policy for the container image) and pulls the container image from the container registry 402 to provide the container image for deployment thereof.

Figure 7:
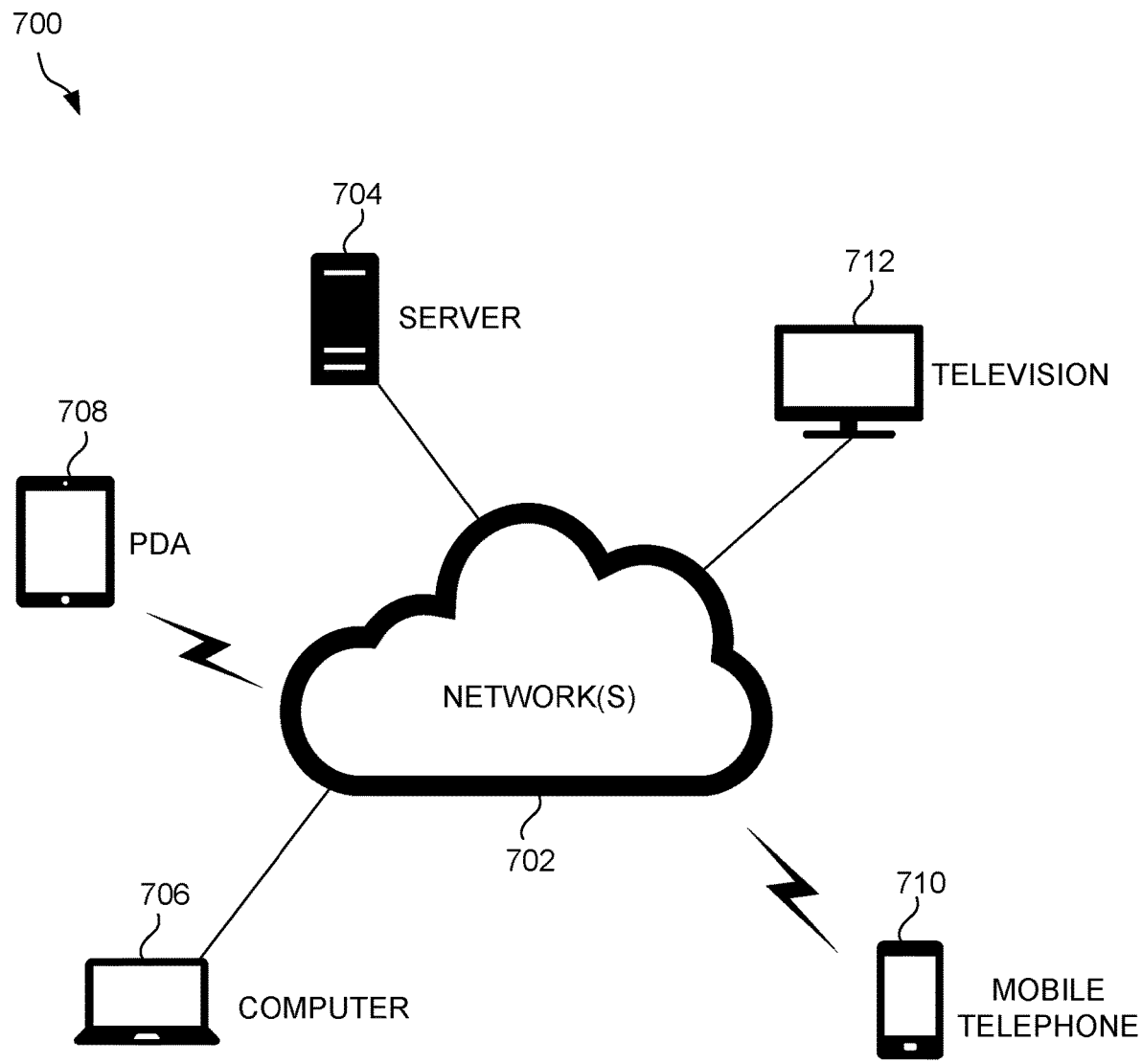
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
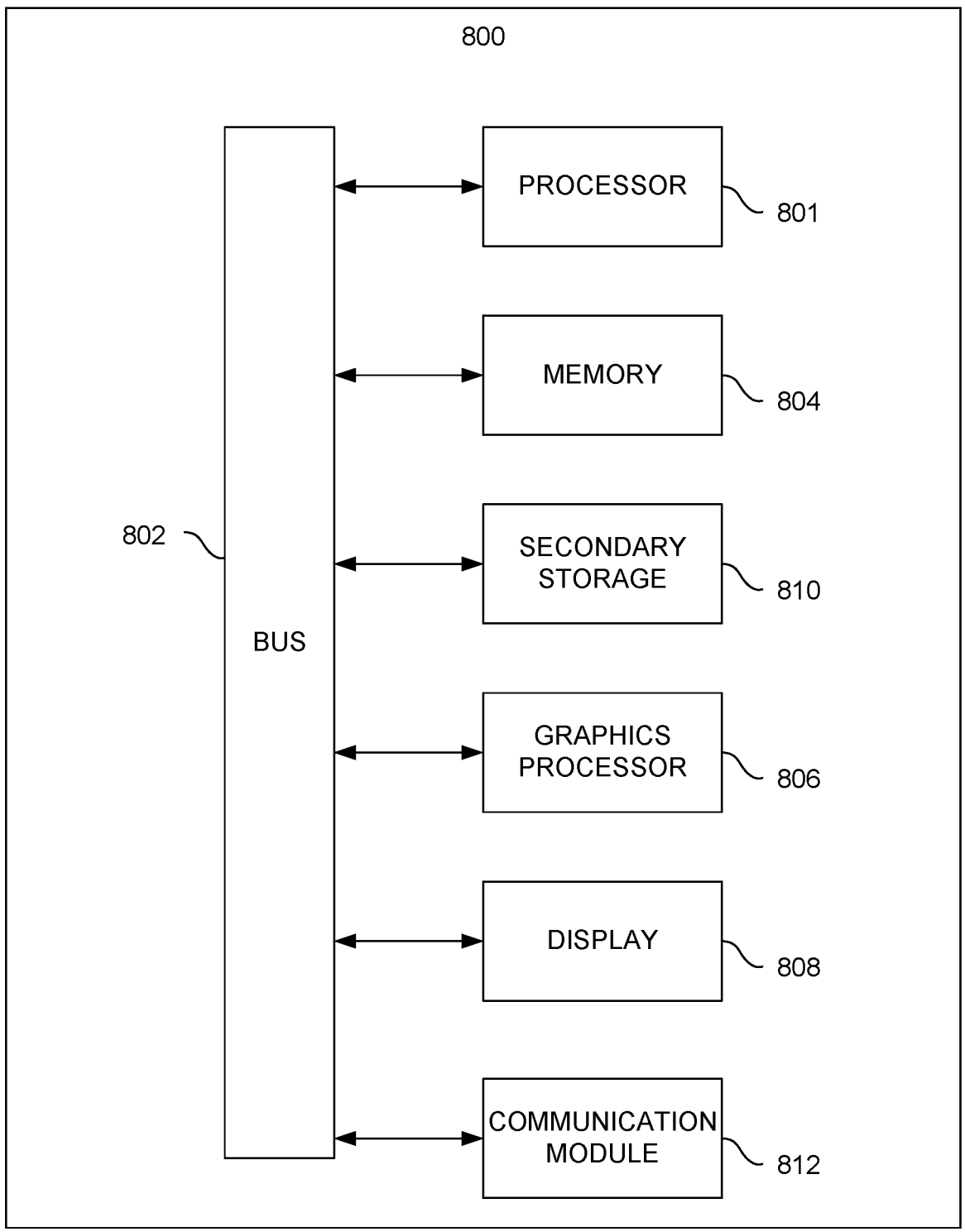
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   identify a request to access a container image;
   in response to the request, retrieve a digest of the container image from a container registry that stores the container image and the digest of the container image;
   retrieve, from a safe list repository, a safe list of digests previously generated for the container image;
   verify a signature used to sign the safe list;
   in response to verifying the signature used to sign the safe list, validate the digest retrieved from the container registry against the digests included in the safe list; and
   provide the container image from the container registry as a response to the request, based on a result of the validating.

2. The non-transitory computer-readable media of claim 1, wherein the computer instructions, when executed by the one or more processors of the device, further cause the device to:

in response to verifying the signature, store the safe list as a validated safe list.

3. The non-transitory computer-readable media of claim 2, wherein storing the safe list as the validated safe list includes storing the safe list in a trusted safe list repository.

4. The non-transitory computer-readable media of claim 3, wherein the safe list is formatted prior to storing the safe list in the trusted safe list repository.

5. The non-transitory computer-readable media of claim 2, wherein when the signature is not verified, the safe list is stored in an untrusted safe list repository.

6. The non-transitory computer-readable media of claim 2, wherein the safe list is generated and stored in the safe list repository by:

accessing the container image, creating the safe list for the container image, signing the safe list with the signature to form a signed safe list, and storing the signed safe list in the safe list repository.

7. The non-transitory computer-readable media of claim 2, wherein the safe list is created prior to receiving the request.

8. The non-transitory computer-readable media of claim 1, wherein validation of the digest is repository-agnostic.

9. The non-transitory computer-readable media of claim 1, wherein when the result of the validation is that the digest retrieved from the container registry is valid, the the container image is provided from the container registry to a requestor or other designated entity.

10. The non-transitory computer-readable media of claim 1, wherein when the result of the validation is that the digest is not valid, the response to the request includes rejecting the request to access the container image.

11. The non-transitory computer-readable media of claim 10, wherein when the result of the validation is that the digest is not valid, the response to the request further includes providing information enabling already deployed infrastructure and application to cope with gaps induced by the rejection.

12. The non-transitory computer-readable media of claim 1, wherein the request to access the container image is generated based on a request to deploy a microservice represented by the container image.

13. A method, comprising:

at a computer system:

identifying a request to access a container image;

in response to the request, retrieving a digest of the container image from a container registry that stores the container image and the digest of the container image;

retrieving, from a safe list repository, a safe list of digests previously generated for the container image;

verifying a signature used to sign the safe list;

in response to verifying the signature used to sign the safe list, validating the digest retrieved from the container registry against the digests included in the safe list; and providing the container image from the container registry as a response to the request, based on a result of the validating.

14. A system, comprising:

a non-transitory memory storing instructions; and one or more processors in communication with the non-transitory memory that execute the instructions to:

identify a request to access a container image;

in response to the request, retrieve a digest of the container image from a container registry that stores the container image and the digest of the container image;

retrieve, from a safe list repository, a safe list of digests previously generated for the container image;

verify a signature used to sign the safe list;

in response to verifying the signature used to sign the safe list, validate the digest retrieved from the container registry against the digests included in the safe list; and provide the container image from the container registry as a response to the request, based on a result of the validating.

15. The system of claim 14, wherein the system is a multi-tenant system.

16. The system of claim 15, wherein different tenants of the multi-tenant system generate container image digests differently.

* * * * *